United States Patent [19]

Flower et al.

[11] Patent Number: 4,889,325
[45] Date of Patent: Dec. 26, 1989

[54] FLUID FILLED VIBRATION ISOLATOR

[75] Inventors: Wallace C. Flower, McKean; Richard P. Thorn, Erie, both of Pa.

[73] Assignee: Lord Corporation, Erie, Pa.

[21] Appl. No.: 231,918

[22] Filed: Aug. 15, 1988

[51] Int. Cl.$^4$ .............................. F16F 9/00; F16F 13/00; B60K 5/12
[52] U.S. Cl. .................................. 267/140.1; 267/141; 267/219
[58] Field of Search .............. 267/140.1, 219, 220, 267/141, 140.2, 140.3, 140.5, 141.1, 152, 153; 248/562, 636; 180/902, 312, 300; 188/320; 123/195 R

[56] References Cited

U.S. PATENT DOCUMENTS

| | | | |
|---|---|---|---|
| 4,651,980 | 3/1987 | Arai et al. ...................... | 267/140.1 |
| 4,657,232 | 4/1987 | West ................................ | 267/140.1 |
| 4,679,778 | 7/1987 | Tabata et al. ................... | 267/140.1 |
| 4,708,329 | 11/1987 | Tabata et al. ................... | 267/140.1 |
| 4,709,907 | 12/1987 | Thorn ............................... | 267/140.1 |
| 4,720,086 | 1/1988 | La Salver ........................ | 267/140.1 |
| 4,726,573 | 2/1988 | Hamaekers et al. ............ | 267/140.1 |
| 4,753,422 | 6/1988 | Thorn ............................... | 267/140.1 |
| 4,757,982 | 7/1988 | Andrä et al. .................... | 267/140.1 X |
| 4,783,063 | 11/1988 | Probst et al. .................... | 267/140.1 |

FOREIGN PATENT DOCUMENTS

| | | | |
|---|---|---|---|
| 3140783 | 4/1983 | Fed. Rep. of Germany ... | 267/140.1 |
| 3638647 | 5/1987 | Fed. Rep. of Germany ... | 267/140.1 |
| 0018633 | 1/1985 | Japan ............................... | 267/140.1 |
| 0147139 | 7/1987 | Japan ............................... | 267/140.1 |
| 2156617 | 4/1986 | United Kingdom ............ | 267/140.1 |

*Primary Examiner*—Douglas C. Butler
*Attorney, Agent, or Firm*—Philip P. McCann; James W. Wright

[57] ABSTRACT

A fluid filled vibration isolator of the type having upper and lower chambers separated by a partition having an inertia track passageway and a decoupler assembly permitting fluid to bypass the inertia track passageway at certain amplitudes. The decoupler assembly includes a plurality of wafers loosely contained within a cavity in the partition. The wafers have a predetermined density and occupies less than the entire cavity when at rest therein. At low amplitudes of vibration, the plurality of wafers oscillates in a dispersed condition as the fluid oscillates through the screened cavity essentially bypassing the inertia track passageway between the chambers. As the amplitude of vibrations increase beyond a certain level, the plurality of wafers compacts alternately against the screens to throttle flow therethrough and thereby cause the fluid to oscillate in the inertia track passageway.

7 Claims, 4 Drawing Sheets

FLUID FILLED VIBRATION ISOLATOR

FIELD OF THE INVENTION

The present invention relates to fluid filled vibration isolators, and more particularly, the present invention relates to fluid filled vibration isolators of the type which utilize an inertia track passageway in combination with a decoupler element to control fluid motion between a pair of opposed chambers in response to vibrations.

BACKGROUND OF THE INVENTION

In recent years there has been an increased emphasis in the use of fluid filled vibration isolators for various applications. For instance, the advent of lighter weight automobile components has generated a need for greater precision in the control of vibrations induced by normal power plant oscillations and road conditions. Because of the capability of such isolators to be designed to operate with precision, they are particularly useful in mounting engines and transmissions in modern automobiles.

The typical fluid filled vibration isolator includes a pair of opposed flexible wall chambers separated by a partition having a passage providing fluid communication between the chambers. In some fluid filled vibration isolators of this type, the passage is provided by a so-called inertia track passageway providing fluid communication in an arcuate path between the chambers. Fluid oscillates in the inertia track to provide desired dynamic stiffness characteristics at certain excitation frequencies. An example of such an isolator is disclosed in U.S. Pat. No. 4,262,886.

U.S. Pat. No. 4,159,091 discloses a fluid filled vibration isolator which utilized disc-like elements and diaphragms mounted in a passage located between opposed fluid filled chambers. The disc-like element moves in response to flexure of the chamber walls and alternating pressurization of the fluid contained therein to achieve desired dynamic stiffness characteristics.

U.S. Pat. Nos. 4,720,086 and 4,422,779 are exemplary of fluid filled vibration isolators which incorporate both an inertia track passage and a disc or diaphragm element, or decoupler, as the term is used in the art, to obtain the desired dynamic stiffness. In this type vibration isolator, the movable element which may be either a diaphragm or a disc, cooperates with the inertia track to automatically couple and decouple the inertia track relative to the pumping action from the chambers. For instance, at low amplitudes of vibration, the movable element, or decoupler, simply oscillates in response to fluid flow oscillations between the chambers, and the inertia track is relatively quiescent, or decoupled. At greater amplitudes of vibration, however, the decoupler requires all the excess fluid volume to flow through the inertia track, thereby coupling the chambers. This type vibration isolator has a relatively low dynamic stiffness at low amplitudes of vibration over a broad range of excitation frequencies and higher dynamic stiffness at higher amplitudes with regions of minimum dynamic stiffness at certain low and high excitation frequencies. Furthermore, the damping of disc or diaphragm decouplers can be characterized at a particular frequency as providing high magnitude for a narrow range of frequency for higher amplitude vibration. Reference is made to FIG. 7A.

U.S. Pat. No. 4,709,907 discloses a vibration isolator having a decoupler assembly including a mass of particulate matter loosely contained within a screened cavity in the partition. The particulate matter has a predetermined density and interstitial volume occupying less than the entire cavity when at rest therein. At low amplitudes of vibration, the particulate matter oscillates in a dispersed condition as the fluid oscillates through the screened cavity essentially bypassing the inertia track passageway between the chambers. As the amplitude of vibrations increases beyond a certain level, the particulate matter compacts alternately against the screens to throttle flow therethrough and thereby cause the fluid to oscillate in the inertia track passageway. The vibration isolator of this patent provides a quiet acting isolator. The damping of the particulate matter decoupler can be characterized when compared to the disc or diaphragm type decoupler as providing reduced magnitude of damping for a broader range of frequency at a substantially higher frequency. Reference is made to FIG. 7B which shows a phase/frequency curve for vibration isolator having a particulate decoupler.

U.K. Patent Specification No. 2,104,619A discloses a fluid filled vibration isolator utilizing a porous mass constrained between screens to throttle flow between chambers continuously. This isolator does not have an inertia track, nor does it have a decoupler. The porous mass provides a constant resistance to fluid flow.

For a more complete discussion of the structure and operational characteristics of fluid filled vibration isolators, reference is made to an article entitled *A New Generation of Engine Mounts*, by Marc Bernuchon, SAE Technical Paper Series 840259, 1984, the disclosure of which is incorporated by reference herein.

While vibration isolators of the type just described have certain advantages, they also have certain limitations. For example, decoupler disc are generally fabricated of rigid materials as are the cavities in which they are mounted, and such discs tend to seat abruptly under certain operating conditions. As a result, disc-type decouplers tend to generate an audible noise in operation, and this is not desirable in a commercially satisfactory fluid filled vibration isolator. Decouplers of the diaphragm type are quieter, but they have certain limitations. For instance, such decouplers are not as fatigue resistant as disc-type decouplers and do not provide complete low amplitude decoupling. Furthermore, diaphragm type decouplers do not afford the same degree of operational precision as provided by disc-type decouplers. Such isolators are suitable to provide damping of large magnitude and narrow band at a specified frequency.

Particulate matter decouplers are quiet and provide for small magnitude and broad band damping compared to the disc-type or diaphragm decouplers. However, particulate matter decouplers have certain limitations. For instance, such decouplers require loading of the particulate matter in the cage to manufacture. Also, particulate matter decouplers tend to shift the damping to higher frequencies. It is desirous to increase the magnitude of damping at selected frequency and lower the frequency at which it occurs while maintaining the broad characteristics thereof. In particular it is desirous to have a decoupler having damping characteristics of both the disc-type decoupler and the particulate type decoupler.

SUMMARY OF THE INVENTION

With the foregoing in mind, a primary object of the present invention is to provide an improved fluid filled vibration isolating device of the type utilizing an inertia track in combination with decoupling means.

Another object of the present invention is to provide a novel fluid filled vibration isolating device which operates quietly over its full range of design conditions and provide desirous high magnitude damping level.

A further object of the present invention is to provide a smooth-acting, gradually-bottoming decoupler assembly for a fluid filled vibration isolator.

As yet another object, the present invention provides a simple, durable, reliable, and inexpensive decoupler assembly for use in combination with fluid filled vibration isolators having inertia tracks.

As a still further object, the present invention provides a unique means for positively and quietly coupling and decoupling an inertia track with opposed chambers in a fluid filled vibration isolator.

It is a feature of the present invention to have a decoupler in a vibration isolator having a plurality of wafers which permit coupling of the inertia track for a broad range of damping at a desirous magnitude for a selected frequency.

Another feature of the present invention is to provide a wafer with holes therethrough which permit suitable throttling of the fluid flowing from one chamber to another.

It is an advantage of this invention that the vibration isolator incorporating of wafer decoupler provides desirable damping without noise or loss of amplitude of damping.

More specifically, in the present invention a vibration isolating device having a housing with at least one flexible wall, a partition dividing the housing into at least two chambers for containing a working fluid, and an inertia track providing fluid communication between the chambers is provided with quiet-acting decoupling means cooperable with the inertia track to control fluid flow between the chambers. The partition includes a cavity providing fluid communication with both chambers. The decoupler means includes a plurality of wafers loosely contained within the cavity and displaceable between a dispersed condition providing low resistance to fluid flow between the chambers and a compacted condition providing high resistance to fluid flow therebetween. The decoupling means decouples the inertia track by permitting the wafers to float freely in a dispersed condition in the cavity in response to low amplitude oscillations, and at certain higher amplitudes of oscillations, the decoupling means couples the chambers via the inertia track by causing the wafers to compact against the top or bottom of the cavity. Coupling and decoupling occurs quietly and gently.

BRIEF DESCRIPTION OF THE DRAWINGS

The foregoing and other objects, features and advantages of the present invention should become apparent from the following description when taken in conjunction with the accompanying drawings, in which.

DESCRIPTION OF THE PREFERRED EMBODIMENT

Figure 1:
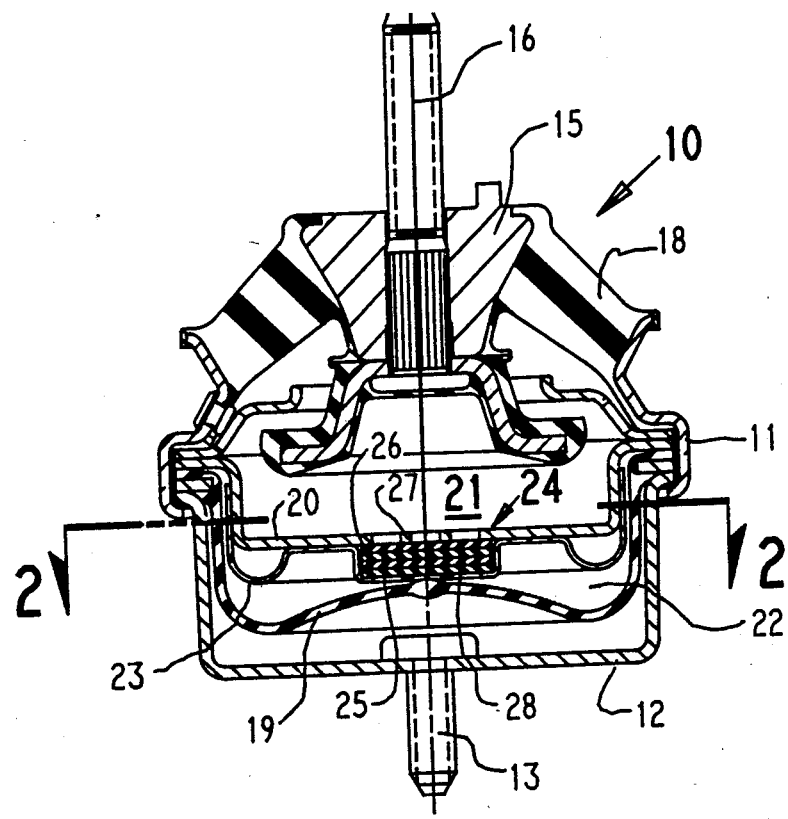
FIG. 1 is a transverse vertical sectional view of a fluid filled vibration isolator embodying the wafer decoupling means of the present invention.

Referring now to the drawings, FIG. 1 illustrates a conical shaped fluid filled vibration isolator 10 which embodies the present invention. The isolator 10 includes a housing 11 having a rigid bottom wall 12 with a threaded mounting stud 13 depending therefrom. A rigid upper wall 15 with a projecting threaded mounting stud 16 is connected to the sides of the housing 11 by a conical block of molded elastomeric material 18 which flexes and permits the upper wall 15 to oscillate vertically with respect to the housing 11. A lower flexible wall or diaphragm 19 of elastomeric material extends across the housing 11 above and substantially parallel to the bottom rigid wall 12. A partition 20 extends across the housing 11 and defines with the upper wall 15 and the flexible elastomeric block 18 an upper primary, or working, fluid tight pumping chamber 21 filled with a substantially incompressible fluid (not shown) such as a mixture of ethylene glycol and water. The partition 20 defined with the lower flexible wall 19 a lower secondary, or expansion, fluid tight chamber 22 which expands and contracts in the normal course of operation of the isolator 10 for receiving working fluid displaced from the upper chamber 21.

Figure 2:
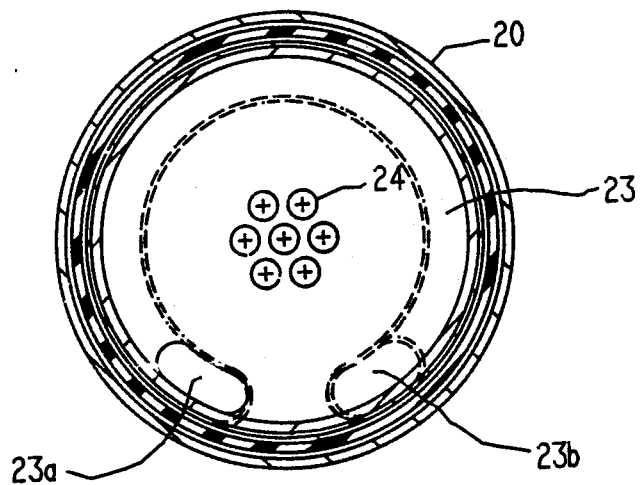
FIG. 2 is a cross-sectional view taken on line 2—2 of FIG. 1.

For the purpose of providing fluid communication between the upper primary working chamber 21 and the lower secondary expansion chamber 22, a so-called inertia track passageway 23 is provided. As best seen in FIG. 2, the inertia track passageway 23 is arcuate and has a substantially uniform cross-section, illustratively of circular shape throughout its entire length. The inertia track passageway 23 has a port 23a at one end opening into the upper chamber 21 and a port 23b at its opposite end opening into the lower chamber 22. The dimensions of the inertia track passageway affect the mass of fluid contained therein and thus affects the resonant frequency of the fluid effect of the isolator 10.

During operation, oscillating movement of the upper wall 15 relative to the partition 20, as by movement of a member connected to its stud 16 causes working fluid to oscillate in the inertia track passageway 23 between the primary chamber 21 and the secondary chamber 22. A vibration isolator of this construction may have a minimum complex dynamic stiffness at a relatively low excitation frequency and over a relatively narrow range of frequencies. For many applications, it is desirable for the inertia track passageway 23 to be relatively inactive, or decoupled, at small amplitudes of excitation, and active, or coupled, at higher amplitudes of excitation over a range of frequencies.

In order to couple and decouple the inertia track passageway 23 and the upper and lower chambers 21 and 22 at certain amplitudes of vibration, it is known to provide decoupling means in the partition. As discussed heretofore, the conventional decoupling means includes a cylindrical passage extending through the partition 20, and may include either a diaphragm therein (not shown) or a disc, slightly smaller in size than the passage, mounted therewithin for osciallation between upper and lower annular seating elements in response to vibrations of a certain amplitude. Also, the partition may include a cage containing particulate matter. Amplitudes of vibration in excess of a predetermined small level cause either the diaphragm or the disc to seat against either its upper annular seat or its lower annular seat or the particulate matter to seat against the cage for blocking flow through the passage and thereby requiring all fluid to flow in the inertia track 23 between the chambers 21 and 22.

As described thus far the vibration isolator 10 is of conventional construction. Because the disc are fabricated of rigid materials, and the seating elements of metal, such decouplers generate audible noises as the decoupling element seats under certain operating conditions. Such noises are undesirable. Diaphragm decouplers are quieter but have other limitations. The particulate matter decouplers increase the manufacturing difficulties.

The present invention provides improved decoupling means 24 which functions quietly to coupler and decouple the inertia track, and which is simple, durable, reliable and relatively inexpensive to produce. Further, the wafer decoupler provides damping characteristics of higher magnitude than the particulate matter and shifts the damping to lower frequencies. To this end, the decoupling means 24 of the present invention operates utilizing a plurality of wafers 25, each having multiple projections extending therefrom of predetermined characteristics in combination with the cavity to control fluid flow. This enables the decoupler to provide a variable resistance to fluid flow and hence to provide a smooth throttling action with low impact energy. It is understood that although wafers having conical projections therefrom are illustratively described herein, other wafers without projections are also suitable.

Figure 3:
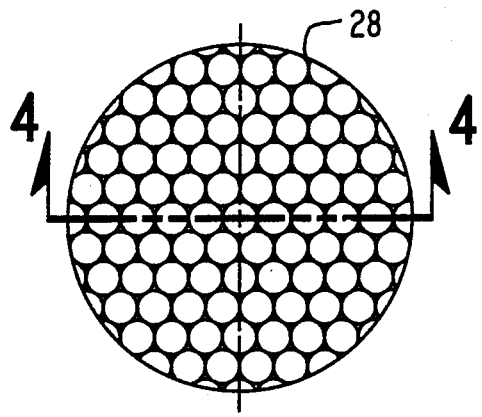
FIG. 3 is a plan view of a wafer used in the decoupler of the present invention.
Figure 4:
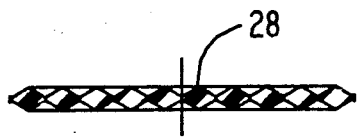
FIG. 4 is a cross-sectional view taken along lines 4—4 of FIG. 3.

A wafer 25 used in the present embodiment is shown in FIGS. 3 and 4. The wafer 25 is a circular thin member having a interstitials 25a of a thickness of about 0.25 mm. A plurality of interconnected conical projections 25b extending from both sides of the interstitials. The overall thickness of the wafer is about 2 mm.

Furthermore, as best seen in FIG. 1, the decoupler means 24 of the present invention is formed by two plates, an upper plate 27 and a lower plate 28 which are joined together to form the partition plate 20 and define a cavity 29 therebetween. Each of the plates 27, 28 having a series of apertures or openings 27a, 28a that provide direct fluid communication between the chambers 21 and 22 and the cavity 29. The four wafers 25 are loosely contained within the cavity 29 and preferably, when at rest, occupy up to about 80% of its volume. Thus, the four wafers 25 are loosely contained in the cavity and are capable of being vertically displaced between the compacted condition illustrated in FIGS. 5A and 5C and the dispersed condition illustrated in FIG. 5B to control fluid flow through the cavity 29.

Figure 5A:
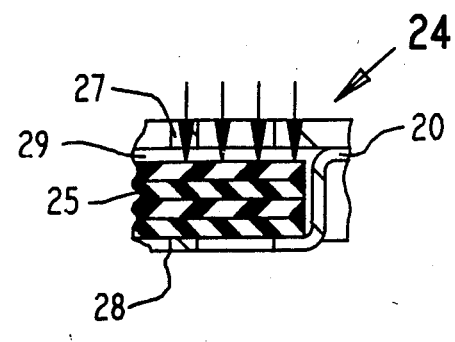
FIGS. 5A–5C are enlarged fragmentary cross-sectional views illustrating the decoupling means of the present invention in several stages of operation.
Figure 5B:
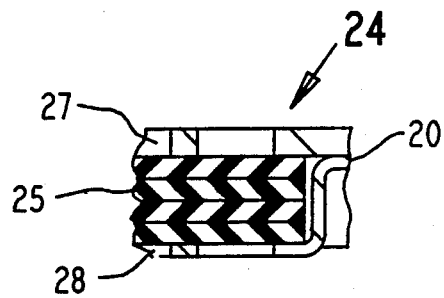
Figure 5C:
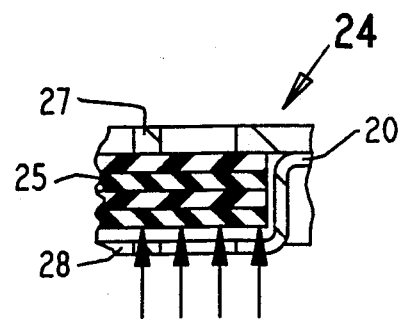

When the wafers are in the compacted condition engaged with the lower plate 28, as illustrated in FIG. 5A, the wafers 25 substantially completely blocks flow across the partition 20 between the upper and lower chambers, 21 and 22, and thereby couplers the same via the inertia track 23. When the wafers 25 are in the dispersed condition illustrated in FIG. 5B, however, fluid is permitted to oscillate directly between the upper and lower chambers 21 and 22, and the inertia track 23 is effectively decoupled. When the wafers are compacted against the upper plate 27, as illustrated in FIG. 5C, flow through the cavity 29 is blocked and the inertia track 23 thus coupled. While a complete blockage of fluid flow through the decoupler means 24 is desirable, slight leakage is permissible, provided a sufficient pressure drop exists across the compacted wafers 25, at least for certain applications. The slight leakage may be induced by perforating one or more of the wafers to allow for leakage fluid flow. Such leakage will broaden the peak damping but lower the magnitude of damping.

To insure satisfactory operation of the decoupling means, it is preferably for the wafers to have a density corresponding substantially to the density of the working fluid contained in the chambers. A desirable working fluid is water containing anti-freeze additives such as ethylene glycol, and the like. Thus, the wafer should have a specific gravity approaching unity. Wafers substantially denser than the density of the working fluid are not as desirable; however, because of their inertia and lack of buoyancy, denser particles may be used to tune the resonant frequency of the decoupler. Preferred material for the wafers include plastic, elastomeric and thermal plastic materials. Projections of the wafer may include various regular and irregular shapes, including conical and polygonal configurations. Furthermore, each of or some of the plurality of wafers in a decoupler may vary with respect to material or properties thereof. For example, the modulus of each of or some of the wafers may differ in a decoupler. Nesting and partially nesting sets of projections can be used to provide desired stiffness and deflection capabilities.

Decouplers incorporating a plurality of wafers should possess certain void volume in order to function satisfactorily to block fluid flow. Void volume is essentially a measure of the spacing between the wafers and the wafers and the upper and lower plates. In tests conducted with a wafer of a interstitial thickness of 0.25 mm and having an overall thickness of 2 mm the void volume constitutes about 10–50% of the packed volume of the cavity 29. Void volumes are dependent on the desired characteristics of the fluid mount.

In the illustrated embodiment, the wafers are contained between a pair of plates the size of holes in which are independent of the cone-shaped projections contained on the wafers therebetween. If desired, other foraminous or perforate means may be utilize to contain the wafers including labyrinths, foams, slits, and the like, provided they clear readily in response to fluid back flows.

Vibration isolators embodying the present invention have been built and tested. By way of example, and not way of limitation, one such isolator having a series of holes in each of the lower and upper plates 27, 28 and having a cavity with a diameter of about 25 mm and a height of about 10 mm and four wafers, was subjected to tests intended to measure its performance at different amplitudes of vibrations and over a range of frequencies. The complex dynamic stiffness ($K^*$) was determined and plotted.

Figure 6:
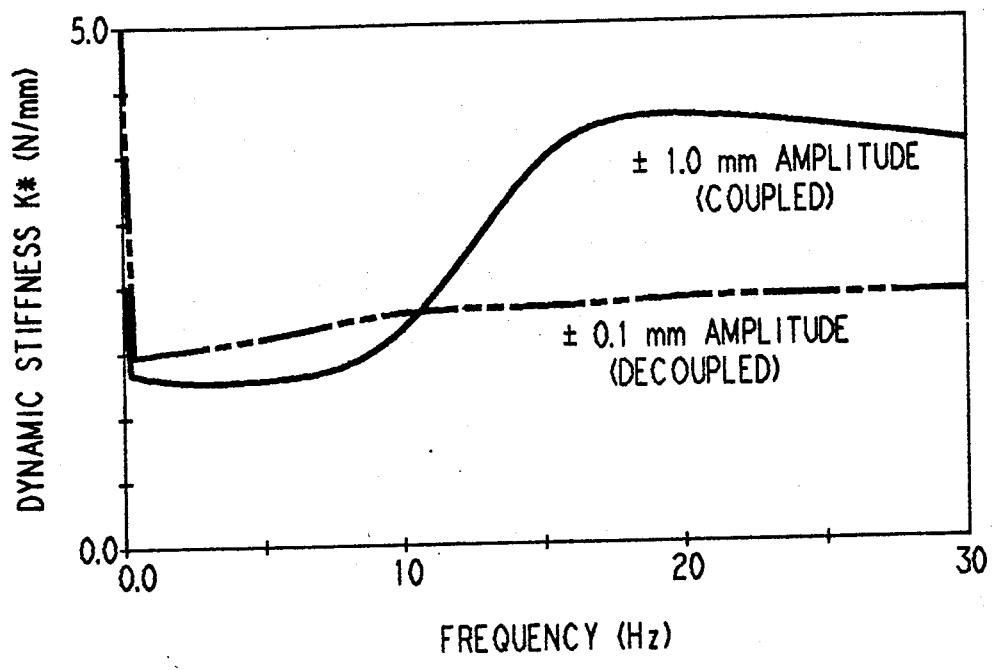
FIG. 6 is a graph illustrating certain operating characteristics of the fluid filled vibration isolator of the present invention.

As best seen in FIG. 6, at low frequencies of vibrations (below about 10 Hertz) the complex dynamic stiffness of the isolator was about the same whether the amplitude was 0.1 mm. or 1 mm., thereby indicating that at low frequencies, the inertia track 23 was decoupled and fluid was simply oscillating in the passage 26 between the upper and lower chambers 21 and 22. As the frequency of oscillation increased beyond about 10 Hertz, the inertia track 23 remained decoupled at an amplitude of 0.1 mm. However, at higher amplitudes, such as 1 mm., the complex stiffness of the isolator increased markedly, indicating that the wafers 25 were throttling flow through the cavity 29 and thereby coupling the inertia track 23 to the chambers 21 and 22.

Figure 7A:
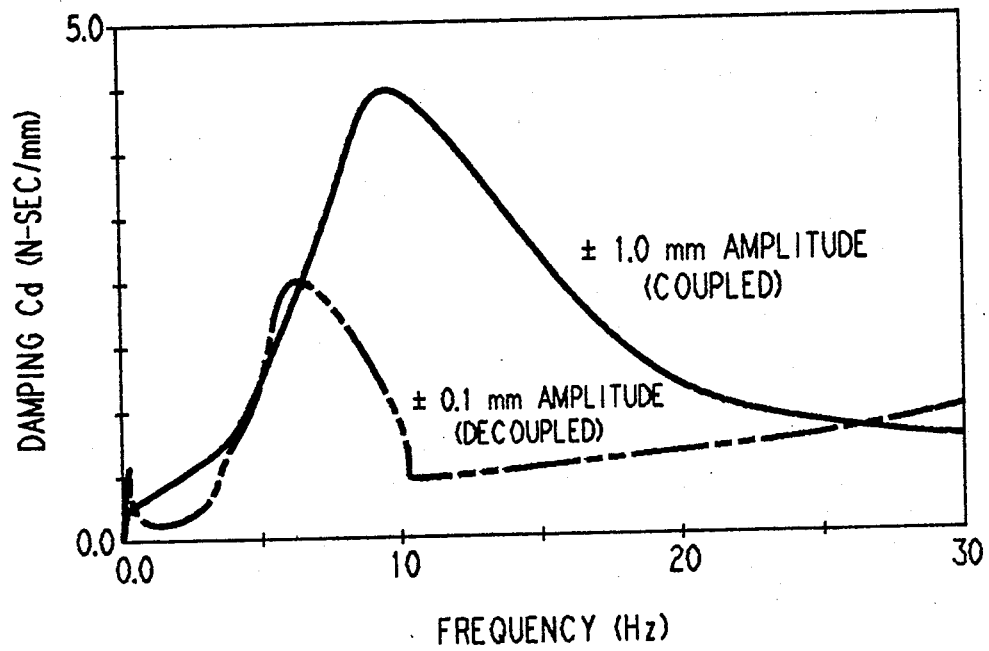
FIGS. 7A–7C are graphs illustrating damping characteristics and differences between a solid disc decoupler, particulate matter decoupler and wafer type decoupler.
Figure 7B:
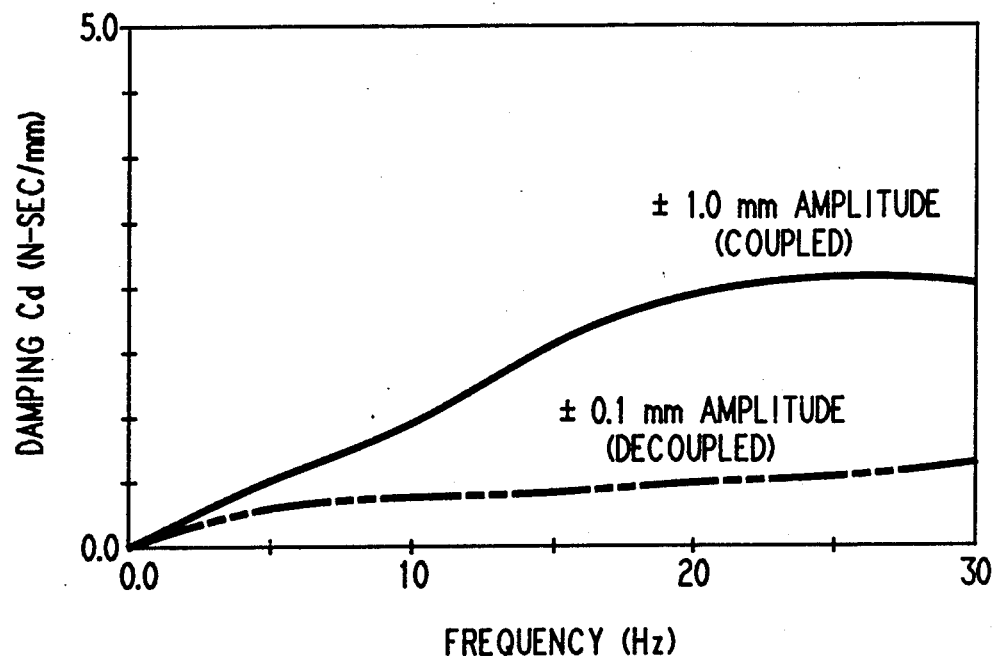
Figure 7C:
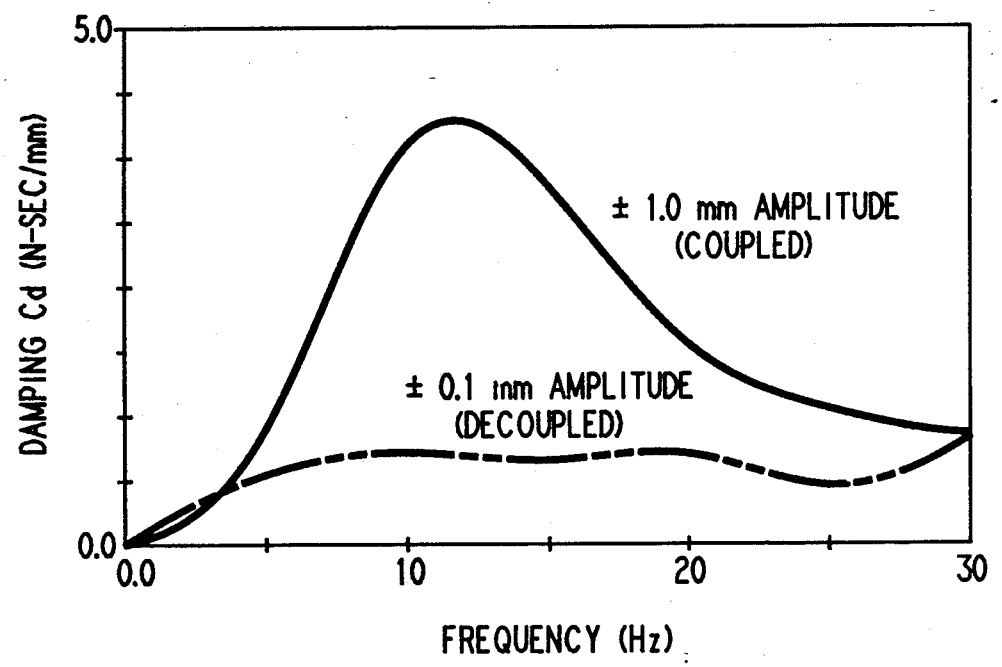

The desired damping characteristics achieved by the wafer type vibration isolator can best be seen in FIGS. 7A–7C which compare the operating characteristics of the prior art of the disc-type FIG. 6A and particulate matter FIG. 7B vibration isolators to the operating characteristics of the wafer type vibration isolator, FIG. 7C. The solid line in each of the FIGS. represent the damping characteristics of the vibration isolator for an input amplitude of $\mp 1.0$ mm. The broken line in each of the FIGS. represent the damping characteristics of the vibration isolator for a small input amplitude of $\mp 0.1$ mm. For the input amplitudes, the wafer type decoupler vibration isolator provides damping characteristics intermediate of the disc type and particulate type decoupler vibration isolator. At $\pm 1.0$ mm input amplitudes, the frequency at maximum damping is slightly greater than that of the disc-type but substantially less than that of the particulate type. The magnitude of damping of the wafer type is slightly less than the disc type but greater than the particulate matter isolator. In summary, the wafer type decoupler isolator achieves desirous damping characteristics of the disc-type and particulate matter isolators by means very different therefrom.

In the course of the reference tests, no audible noise was generated as a result of the movement of the particulate matter and its compaction within the defined cavity. Thus, not only is the vibration isolator of the present invention quiet in operation, but it is resistant to fatigue failure, thereby overcoming the limitations of both disc-type and diaphragm-type decouplers. As a result, the vibration isolator of the present invention is particularly well suited for mounting engines in automobiles.

While a preferred embodiment of the present invention has been described in detail, various modification, alterations and changes may be made without departing from the spirit and scope of the present invention as defined in the appended claims.

What is claimed is:

1. A vibration isolating device comprising a housing with at least one flexible wall portion movable in response to vibrations imparted thereto, a partition dividing the housing into at least two chambers for containing a working fluid displaceable in response to movement of the flexible wall, an inertia track passageway providing fluid communication between the chambers, and decoupling means cooperable with the inertia track passageway to control fluid flow between the chambers, the decoupling means comprises:

a singular compartment having a plurality of ports fluidly interconnecting said chambers,
    a plurality of wafers contained within said singular compartment occupying less than said volume of the compartment and loosely contained in said compartment for providing therethrough a fluid flow path having a variable resistance to flow between the chambers and each of said plurality of wafers, each of the wafers being in a contiguous relationship to an adjacent wafer,
    said plurality of wafers being displaceable by said fluid between a dispersed condition substantially disengaged from said compartment to provide low resistance to fluid flow between the chambers and a compacted condition engaged with said compartment to provide high resistance to fluid flow between the chambers,
    whereby the plurality of wafers cooperated with the compartment and fluid to couple and decouple the inertia track passageway without generating audible noise.

2. A vibration isolating device according to claim 1 wherein the density of each of said plurality of wafers corresponds substantially to the density of the working fluid which oscillates between the chambers.

3. A vibration isolating device according to claim 1 wherein each of said plurality of wafers have multiple projections extending therefrom.

4. A vibration isolating device according to claim 1 where each of said plurality of wafers are perforated.

5. A vibration isolating device according to claim 1 wherein the volume of the compartment occupied by the plurality of wafers is from about 50% to about 90% of the volume of the compartment to permit operative floatation of the wafers in response to fluid flow.

6. A vibration isolating device according to claim 1 having from about 2 to about 6 wafers.

7. A vibration isolating device according to claim 1 wherein said plurality of wafers comprise individual wafer comprising material wherein each or some of said individual wafers have different materials.

* * * * *